Figure 1:
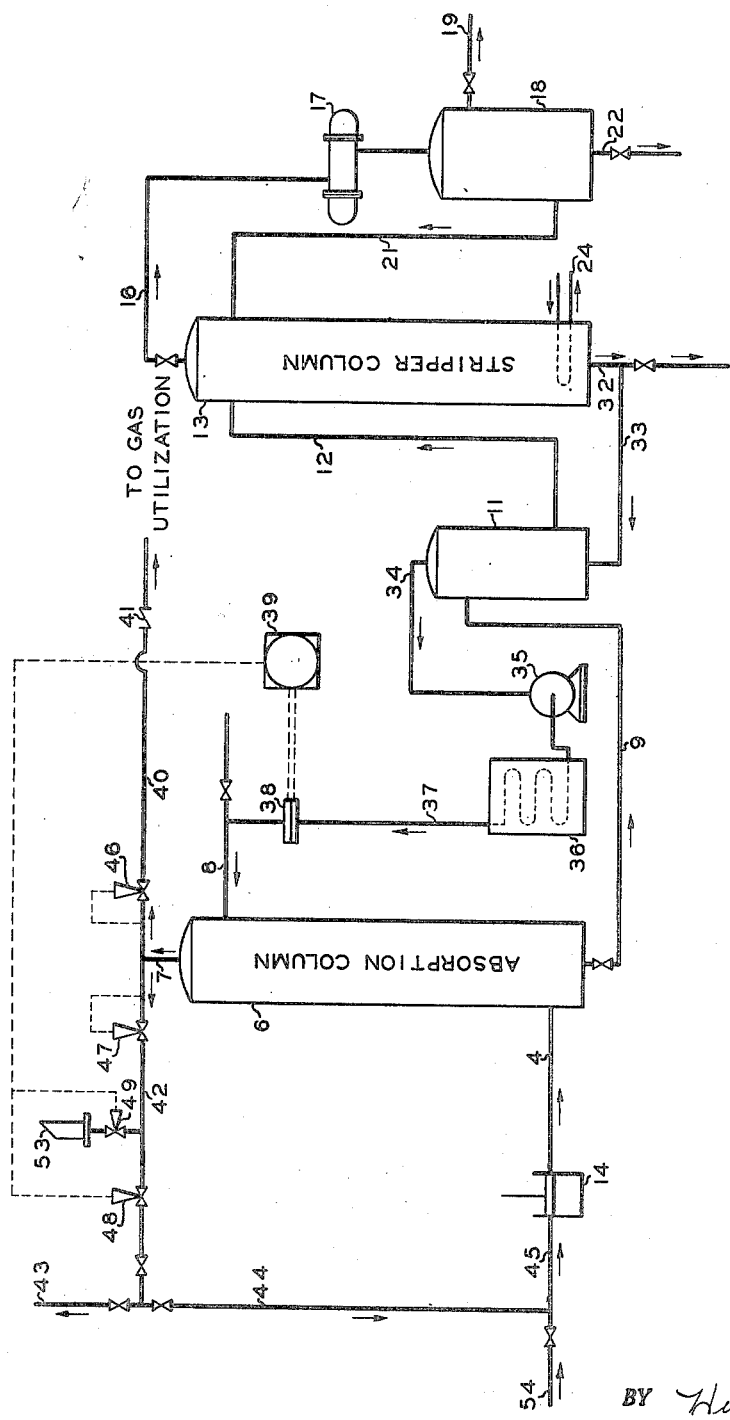

Nov. 30, 1954  F. E. GILMORE  2,695,836
PROCESS AND APPARATUS FOR CONTROL OF GAS TREATMENT
Filed Jan. 2, 1948  2 Sheets-Sheet 1

INVENTOR.
F. E. GILMORE
BY Hudson and Young
ATTORNEYS

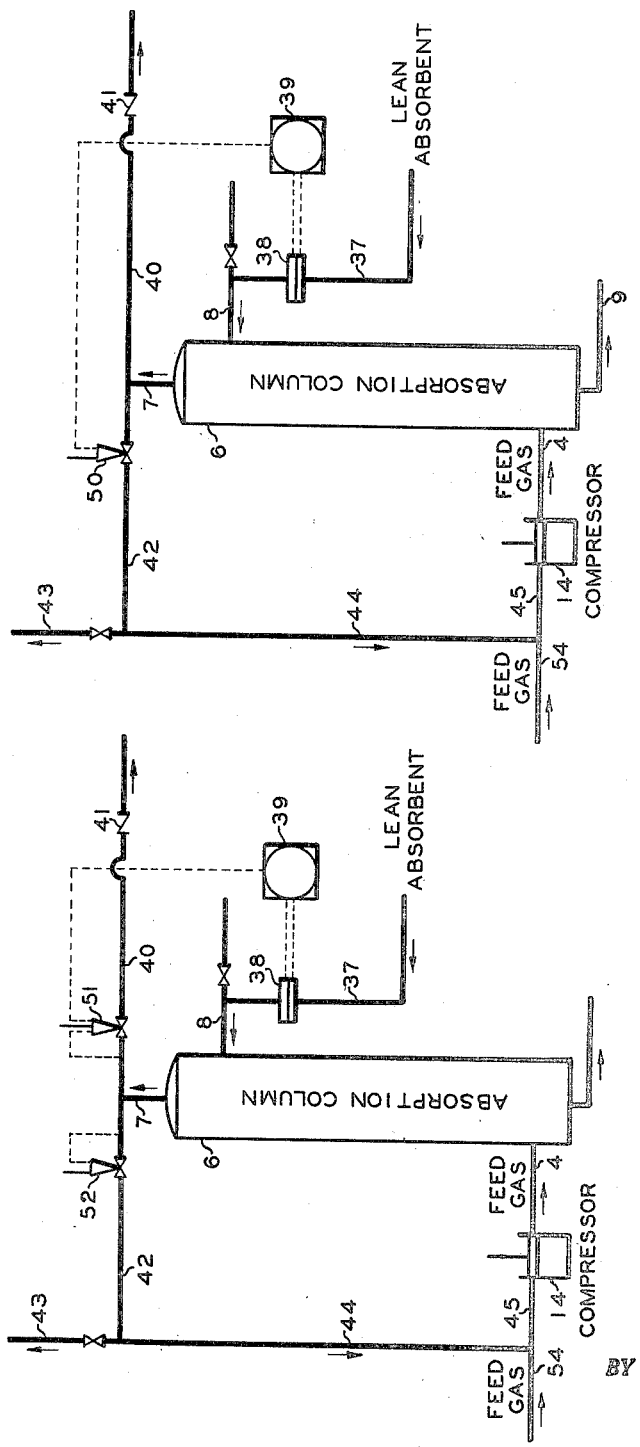

United States Patent Office 2,695,836
Patented Nov. 30, 1954

2,695,836

PROCESS AND APPARATUS FOR CONTROL OF GAS TREATMENT

Forrest E. Gilmore, Bartlesville, Okla., assignor to Phillips Petroleum Company, a corporation of Delaware Application January 2, 1948, Serial No. 332

12 Claims. (Cl. 23—3)

This process relates to the removal from gaseous mixtures of acidic constituents contained therein. In one aspect this invention relates to a process for removing acidic constituents including hydrogen sulfide from gases containing same. In another aspect this invention relates to the prevention of delivery of insufficiently treated gases from a process for the treatment of gases to remove acidic constituents contained therein. In still another aspect this invention relates to an apparatus for automatically preventing the delivery from a gas purification system of a gas insufficiently treated.

Many gases used commonly for various purposes contain acidic constituents which are detrimental to the use of these gases. Particularly normally gaseous mixtures containing hydrocarbons, such as for example, natural gas or by-product light gases of various hydrocarbon conversion processes, are used as fuel, as feed to hydrocarbon conversion processes, and in the production of carbon black. Acidic constituents such as hydrogen sulfide, sulfur dioxide, and carbon dioxide which are often present in these gases usually interfere with the utilization with which these gases are involved and often are injurious to the equipment which the gases contact. Such detrimental effects of acidic impurities in gases necessitates their removal. Generally, gases containing acidic impurities are treated by contacting the gases with a suitable liquid absorption medium to remove the undesirable impurities. Gases containing acidic constituents as impurities are passed into the lower portion of a suitable absorption vessel, usually a bubble-cap type column, to contact a downflowing liquid absorption medium. The gaseous effluent removed from the upper portion of the absorption column is substantially free of acidic impurities. The liquid absorption medium is passed from the absorption vessel to a stripping or rectifying zone for desorption of the acidic impurities from which the desorbed or lean absorption liquid may be recycled to the absorption column.

In such processes the volume of lean liquid recycle per volume of gas being treated must be maintained at or above a minimum value in order to assure the desired degree of removal of the acidic impurities. Such a volume of recycle is dependent upon the concentration of acidic impurities in the feed gas, the capacity of the specific absorption medium selected and the desired degree of removal of acidic impurities. The type of contacting equipment and its contacting efficiency will in most cases influence or limit the maximum allowable flow rates of gas and absorption medium. All of these factors may be readily determined by methods known to those skilled in the art so that for a specific gas treating unit a minimum flow rate of lean absorption medium may be ascertained. At any time that the rate of recycle flow of lean absorption medium should decrease to below the required minimum, the gas would be incompletely treated, and gas, thus insufficiently treated, would be delivered from the absorber. Such occurrences are undesirable since delivery of treated gas from such an absorption process is normally made to a specific utilization requiring a gas substantially free of acidic impurities. The term utilization herein denotes the use made of the treated gas. In some cases such treated gas comprises feed stock to a conversion process. Often a treated gas may be natural gas for domestic and industrial fuel uses. Regardless of the nature of the specific utilization it is understood to be such that insufficiently treated gas is unsuitable therefore. It is of utmost importance therefore, that such improperly treated gas be withheld from delivery to a utilization normally receiving properly treated gas, since contact therewith would contaminate the larger volume of gas to which the contaminated gas is admixed so as to render its specific value worthless. Such an occurrence usually involves "blowing off" the contaminated gas or otherwise discarding it to a use of lessened value. Such a necessary practice is obviously economically undesirable.

An object of this invention is to remove acidic constituents from gaseous mixtures containing same.

Another object is to remove hydrogen sulfide contained in gaseous mixtures.

Another object is to provide an improved process for treating gases to remove acidic constituents therefrom.

Still another object is to provide an apparatus for treating gases to remove acidic constituents therefrom.

It is yet another object to provide an apparatus for preventing the delivery of gas insufficiently treated to remove acidic constituents therefrom to a utilization requiring completely treated gases.

Further objects and advantages of the present invention will become more apparent, to those skilled in the art, from the accompanying description and disclosure.

Occasionally in the operation of the gas treating process, already briefly described, the recycle rate of lean liquid absorbent decreases to a value below a minimum required to adequately treat the incoming gases to the absorber and is consequently responsible for delivery therefrom of gas inadequately treated. There are various causes for occasional failures of the recycle rate. For example, a decrease in the rate of lean liquid recycle may result from failure of recycle pumping facilities such as the actual breakage of the pump, vapor locking, or failure of the prime mover which may be for example, an electric motor, or a steam turbine. Also, any unscheduled build-up of pressure within the utilization proper may require an increased absorber pressure for delivery thereto of treated gas, consequently increasing the load on the lean absorber pumping facilities to comprise another source of partial or complete failure of the lean liquid recycle.

I have now developed an important improvement in the process briefly described above for treating gases. My improvement comprises a means of preventing delivery of treated gas from such a process to its utilization when it is insufficiently treated due to an inadequate recycle flow of lean absorbent to the absorber.

In accordance with this invention acidic constituents such as hydrogen sulfide, carbon dioxide, etc., contained in a gaseous hydrocarbon mixture are substantially completely removed therefrom by contacting the gaseous mixture with a liquid absorption medium.

When referring herein to an absorption medium it is meant any liquid medium which will remove acidic constituents from the gaseous mixture being treated by solubility of the acidic constituents therein or by chemical combination therewith. Absorption media suitable for the removal of hydrogen sulfide, carbon dioxide, and other acidic gases often comprise aqueous solutions of organic bases such as monoethanolamine, diethanolamine, triethanolamine, and diethanolamine-diethyleneglycol. Other suitable media are aqueous solutions of sodium carbonate, tripotassium phosphate, sodium and potassium alcoholates, and an alkali metal or an alkaline earth hydroxide which may be in admixture with a suitable solutizer such as nitromethane, polyalkenes, and polyamines.

In a preferred form of this invention, natural gas containing hydrogen sulfide as the chief acidic constituent is introduced to the lower portion of an absorption column wherein it is passed upwardly and countercurrently to a down flow of a liquid absorption medium. The absorption medium enriched with the acidic constituents is removed from the bottom of the column and passed to a stripper or desorber column wherein the acidic gases are removed from the absorption medium. The thus lean absorption medium is withdrawn from a lower portion of the desorber column and recycled at a predetermined rate to the absorption column. The gaseous hydrocarbon effluent of the absorption column, substantially free of acidic constituents, when the flow rate of recycled lean absorbent is equal to or above a predetermined minimum rate, is passed from the top of the column to the desired utilization. When the recycle lean liquid rate decreases to below the predetermined minimum rate, the flow of gas thus insufficiently treated is directed to an emergency line by an automatic control means which diverts the flow thereto from the regular utilization. The flow of effluent gas thus diverted is directed to a predetermined disposal or can be recycled through the emergency line to the absorber for retreatment. The automatic control system comprises a recycle liquid flow responsive means, usually an orifice type meter, located in the lean absorbent recycle line, a control means, usually a rate of flow controller, actuated by the liquid flow responsive means, one or more diaphragm-type control valves controlled by the rate of flow control means and in some cases, one or more back pressure control valves. The location and function of these valves in various combinations with respect to the flow responsive means and the rate of flow control means is such that the flow of gas from the absorption column to the regular utilization is quickly and efficiently diverted in response to action of the rate of flow control means responding to the lean liquid flow responsive means located in the recycle liquid line.

The various individual pieces of control equipment employed herein are of conventional well-known function and design. Consequently, only brief reference is made herein to their description. Back pressure valves employed herein may be of any well-known diaphragm type, such as pilot operated valves, pressure balanced valves, or spring loaded valves. In any case, a change in the pressure which is being controlled produces an effect on the diaphragm valve so as to cause it to either open or close. A back pressure control valve can be set to maintain any predetermined pressure. Consequently, a back pressure control valve set to maintain a given pressure tends to move to a more nearly open position at any pressure higher than the set pressure, is more nearly closed at any pressure lower than the set pressure, and "throttles" when operating to maintain a pressure within a narrow range of the set pressure. The lean liquid flow responsive means is preferably an orifice meter and is connected to a control means, preferably a rate of flow control instrument. By flow responsive means is meant any element or device which responds to or detects a condition of flow in a line. Such responsive means include all devices which partially restrict the flow and thus establish a pressure differential, in a portion of the line, which is a function of the rate of flow. Thus an orifice plate, venturi, flow-nozzle, wobble plate, propeller, rotameter etc., may be used in the practice of this invention. Likewise the control means may include any instrument or device which is actuated by the flow responsive means to produce a control effect which may take the form of a change in pressure or rate of flow of a hydraulic fluid usually called the controlled fluid, or of an electric circuit which is energized or de-energized. In some instances the responsive means may be a pressure control valve which would respond to the reduction of a lean liquid recycle flow. In some instances the responsive means may be a pressure control valve which would respond to the reduction of lean liquid flow, and the control means, a pressure controller. The motor valves referred to herein are of the conventional diaphragm type and are controlled by the liquid flow responsive means in combination with the control instrument so that when the recycle lean liquid rate of flow as determined by the lean liquid flow responsive means decreases to below the predetermined minimum rate, a control effect will be produced by the rate of flow control means which will open or close the motor valve as the case may be. For example, when the rate of flow of lean liquid decreases to below the predetermined minimum a "baffle" or "flapper" in the rate of flow control means actuated by the lean liquid flow responsive means will be brought into a more nearly closed position relative to an air-nozzle which produces an increase in the controlled air-pressure from the control instrument, communicating with the diaphragm of the motor valve. Such a control effect increases the pressure on the diaphragm and causes the motor valve to open or close depending upon the particular control combination employed.

In order to further describe the apparatus of this invention reference is made to the attached drawings. The drawings each diagrammatically represent an arrangement of apparatus suitable for the practice of this invention. In order that this invention may be more clearly understood and its application realized a brief description of a process for the removal of hydrogen sulfide from a gaseous hydrocarbon stream by contact with a liquid absorption medium will be made. It is to be understood that the flow diagrams are diagrammatic only and may be altered in many respects by those skilled in the art and yet remain within the scope of my invention.

Referring now to Figure 1, a hydrocarbon stream, such as natural gas, containing hydrogen sulfide in an amount between 2 and 100 grains, or higher, per 100 cu. ft., (60° F., 1 atmosphere) is passed from line 54 through line 45 to the intake of compressor 14 and discharged therefrom through gas inlet 4 to absorber 6. The hydrocarbon stream passes upward through baffles, trays, or packing in absorber 6 countercurrently to a down-flowing liquid absorption medium. A gaseous hydrocarbon stream substantially free from hydrogen sulfide and other acidic materials is removed from absorber 6 through line 7. The hydrogen sulfide content of the effluent hydrocarbon stream is usually below about 1½ grains, and may be as low as 0.02 grains, per 100 cu. ft. of gas (60° F., 1 atmosphere). The liquid absorption medium, usually an aqueous solution of one or more ethanolamines, is introduced into the upper portion of absorber 6 through line 8. The enriched liquid absorption medium is removed from the lower portion of absorber 6 and is passed to heat exchanger 11 through line 9 and then to stripper 13 through line 12.

Suitable temperatures and pressures are maintained in absorber 6 to insure removal of substantially all of the hydrogen sulfide from the hydrocarbon stream by absorption or chemical reaction. The pressure within absorber 6 corresponds in some cases to the pressure available in the incoming hydrocarbon stream, in which instance a compressor 14 is not used, but more generally the desired pressure is supplied by means of compressor 14 in gas inlet line 4. The temperature is maintained in absorber 6 above the dew point of the hydrocarbon stream being treated. In general, the temperature is maintained between about 60 and about 150° F. at an existing pressure between atmospheric and 800 p. s. i.

Hydrogen sulfide and other acidic material dissolved in the enriched liquid absorption medium are desorbed in stripper 13 by heating. Heat is supplied to stripper 13 by passing steam through heating element 24 located at the bottom of stripper 13. Hydrogen sulfide and water vapor pass overhead from stripper 13 through line 16 and then through condenser 17 to accumulator 18. Water vapor is condensed in condenser 17 and the resulting condensate is collected in accumulator 18. Hydrogen sulfide and other gases, if any, are vented from the system through line 19. A portion or all of the condensate in accumulator 18 is passed through line 21 to the upper portion of stripper 13 as a liquid reflux therefor and as make-up for the system. Liquid absorption medium substantially free from hydrogen sulfide accumulates in the lower portion of stripper 13. The reactivated absorbent medium is withdrawn from stripper 13 through line 32 and may be recycled directly to absorber 6 by means of recycle pump 35 through line 33, heat exchanger 11, line 34, cooler 36, line 37, and line 8.

Generally, conditions of temperature in the range of about 200° F. to about 250° F., and of pressure in the range of from atmospheric to about 10 p. s. i. is maintained in stripper 13. Stripper 13 contains conventional bubble trays, baffles, or packing to insure effective removal of acidic material from the liquid absorption medium. Make-up absorption liquid may be added to the system through line 8. Through line 22 unrecycled condensate may be discharged or make-up water may be added to maintain the proper concentration of treating agent.

A flow responsive means 38, usually an orifice is located in line 37 to detect the rate of flow of recycled lean liquid. A control means 39, usually a rate of flow controller, is actuated by flow responsive means 38 and is located preferably near thereto. Effluent gas from absorber 6 is passed through gas outlet line 7 to gas utilization line 40, back pressure valve 46, and check valve 41 to the desired gas utilization, when the flow of recycle lean liquid through line 37, as determined by responsive means 38, is equal to or above a predetermined minimum, such as previously discussed herein. Such a direction of gas flow is referred to hereinafter as normal flow. During normal flow, the flow of lean absorbing liquid is usually in the range of 5 to 15 per cent above the predetermined minimum. Line 42 is an emergency line conducting the flow of gas from gas outlet 7 when the flow of recycled lean absorbing liquid decreases to a rate below the predetermined minimum as determined by responsive means 38. Such flow is referred to hereinafter as the emergency flow. Line 42 conducts the emergency flow to a predetermined disposal through line 43 or to recycle to absorber 6 for retreatment through lines 44 and 45, to the intake of compressor 14 wherefrom it is discharged through line 4 to absorber 6. In such cases lines 42, 44, and 45 comprise an emergency recycle line.

In a preferred arrangement of valves, as shown in Figure 1, valve 46 is a back pressure valve and is located in gas utilization line 40.

During the normal flow, valve 46 throttles to maintain the desired pressure in absorber 6. Valve 47 is also a back pressure valve, and although it is usually located in line 42, it can be located in line 7 upstream from line 42; it is responsive to the pressure in absorber 6. Valve 47 during emergency flow, is set to maintain a pressure in absorber 6 which is slightly lower, such as for example, 5 to 20 p. s. i., than that maintained by valve 46 during normal flow. Consequently during normal flow, valve 47 is open. Valve 48 is a motor valve and is controlled by rate of flow controller 39 which is actuated by responsive means 38, as aforesaid. During normal flow, motor valve 48 is closed. At such a time that the recycle lean liquid rate decreases to below the predetermined minimum flow, rate of flow controller 39, actuated by flow responsive means 38, causes valve 48 to open. The pressure downstream from valve 48 is usually in the range of 50–100 pounds or more below the pressure in absorber 6, and consequently, when valve 48 opens, the pressure in absorber 6 tends to decrease. However, valve 47 is set to maintain pressure in absorber 6 at a level usually only slightly lower, such as 5 to 20 p. s. i., than that maintained during normal flow by valve 46, and consequently, upon initiation of a pressure decrease caused by the opening of valve 48, and/or check valve 41, valve 46 closes, and the flow of gas changes from normal flow to emergency flow and valve 47 throttles at the slightly lower predetermined pressure, maintaining a suitable operating pressure in absorber 6. During emergency flow, gas from gas outlet 7 is usually recycled to absorber 6 for retreatment. However, if desired, it may be passed instead to a disposal through line 43. A gas operated whistle 53 is located preferably in line 42 and sounds as an alarm to the operator that emergency flow has been initiated. Flow thereto of gas is initiated by the opening of motor valve 49 which is controlled by control means 39.

Subsequent to restoration of recycle lean liquid flow at or above the predetermined minimum rate, I prefer to divert from emergency flow to normal flow, manually. Manual operation is preferable in view of the time required, subsequent to restoration of satisfactory recycle lean liquid flow, for purging insufficiently treated gas from the system and for otherwise ascertaining the advisability of assuming a normal flow of sufficiently treated gas to the desired utilization.

However, if desired, the emergency flow can be automatically diverted to normal flow subsequent to restoration of adequate recycle lean liquid flow. In fact, it is necessary to provide special means to avoid automatic diversion to normal flow immediately following the restoration of the required rate of flow of treating liquid. As pointed out hereinbefore, such immediate diversion to normal flow will usually be unsatisfactory because absorber 6 and line 7 together with other lines may contain considerable quantities of insufficiently treated gas. To avoid the delivery of this gas through line 40 it is necessary to have gas flowing at substantially the normal rate in contact with at least the required minimum volume of treating solution for a period of time determined by the size and capacity of vessels, lines etc. Control means 39 will close valve 48 automatically when the rate of flow of treating solution is equal to or above the required minimum rate. In order to provide for the period of time indicated above it is necessary to control the rate of "bleed off" of controlled air pressure from the diaphragm of valve 48. This requires that the "bleed off" orifice be so sized that the valve 48 will not close until a suitable, predetermined amount of time has elapsed.

Another arrangement of valves that can be employed in the practice of my invention is shown in Figure 2. Referring to Figure 2, valve 50 is a motor valve controlled by rate of flow controller 39 actuated by flow responsive means 38 in a manner similar to that of valve 48 already described. In this embodiment, valve 50 is located in emergency line 42 and is closed during normal flow. When the recycle lean liquid flow decreases to below the predetermined minimum, rate of flow controller 39 actuated by flow responsive means 38 causes valve 50 to open. Valve 50 in an open position causes the pressure of absorber 6 to decrease to a pressure below that of the utilization thereby causing check valve 41 to close. Check valve 41 in a closed position diverts the flow of effluent gas in gas outlet line 7 from normal to emergency flow. This arrangement will usually have advantageous application only in instances where there is a relatively low pressure differential between line 45 and line 7.

In Figure 3 is shown another arrangement of valves that can be employed in the practice of my invention. Valve 51 is a back pressure valve and is set to maintain the desired pressure in absorber 6 during normal flow and is located preferably in line 40. Valve 51 is also controlled by control means 39 which is actuated by means 38. Valve 52 is a back pressure valve and is located in emergency line 42 and is set to maintain a higher pressure in absorber 6 than is maintained by valve 51 during normal flow. During normal flow, valve 52 is therefore closed. At such a time that the recycle lean liquid flow decreases to below the predetermined minimum rate of flow, controller 39 actuated by means 38 causes valve 51 to close. Valve 51 in a closed position causes the pressure in lines 7 and 42 to increase until valve 52 opens in response to the increased pressure and serves to initiate the emergency flow.

Those skilled in the art will readily appreciate that insufficiently treated gas may be discharged from absorber 6 as a result of conditions other than a decrease in lean absorbent flow rate. Such other conditions include incomplete reactivation of the absorbing liquid in column 13, a leak in heat exchanger 11 resulting in contamination of the lean liquid or a decrease in the concentration of treating agent in aqueous solution. Any one or combination of above conditions may result in the delivery of insufficiently treated gas. However, in usual plant operation such occurrences are rather infrequent. It is quite possible, however, to utilize apparatus disclosed hereinabove to prevent the continued delivery of insufficiently treated gas into line 40 regardless of the cause of the condition. This can be accomplished by the use of an H₂S recorder such as disclosed in copending application Serial No. 604,607, filed July 12, 1945 by E. A. McClendon. Such a recorder is supplied with a continuous sample of treated gas from the top of absorber 6 in line 7. When the analyzer recorder detects that the H₂S content of the treated gas is in excess of a maximum allowable value, the instrument will operate so as to initiate emergency flow by opening valve 48 in Figure 1, valve 50 in Figure 2, or closing valve 51 in Figure 3. These valves are operated by an increase in the controlled air pressure. Thus increased pressure may be initiated by control means 39 on the H₂S recorder-controller, or the system may be arranged so that either or both instruments produce the effect.

Advantages of this invention are illustrated by the following example. Apparatus, the reactants and their proportions, and other specific ingredients are represented as being typical and should not be construed to limit the invention unduly.

Natural gas containing 100 grains hydrogen sulfide per 100 cubic feet (60° F., 1 atmosphere) was charged to the gas treating system described in Figure 1, at the rate of 63 million cubic feet per day, (60° F., 1 atmosphere). The composition of the gas was as follows:

| Component: | Mol per cent |
|---|---|
| Nitrogen | 9.82 |
| Methane | 76.94 |
| Ethane | 6.65 |
| Propane | 4.07 |
| Isobutane | 0.42 |
| Normal butane | 1.35 |
| Pentanes | 0.46 |
| Hexane and heavier | 0.29 |
| Total | 100.00 |

The lean liquid absorption medium, an aqueous solution containing 18 per cent by weight of monoethanolamine was recycled to the absorber at the rate of 80 gallons per minute. A minimum recycle rate of lean absorption medium of 70 gallons per minute was required for satisfactory treatment of the incoming gas. The absorber during normal flow was operated at a temperature of 90° F. and at a pressure of 300 p. s. i. g. The effluent hydrocarbon gas substantially completely freed of H2S, contained 0.02 grain H2S per 100 cubic feet (60° F., 1 atmosphere). Enriched absorption liquid was passed from the bottom of absorption column to a stripper column and therein stripped of H2S at a temperature of 238° F. and at a pressure of 6 p. s. i. g.

The rate of flow control means was a rate of flow controller of a conventional design. The lean liquid recycle flow responsive means was a conventional orifice placed between a pair of typical meter flanges.

The rate of flow controller was set to cause the motor valve in the emergency line to open in response to a decrease of the recycle lean liquid rate to below 70 gallons per minute. At rates of flow higher than 70 gallons per minute the motor valve was closed.

The back pressure control valve in the gas utilization line was set to control the absorber pressure at 300 p. s. i. g. The back pressure control valve in the emergency line was set to control the absorber pressure at 285 p. s. i. g. Consequently, when the lean liquid recycle rate was higher than 70 gallons per minute and the motor valve closed, the absorber operated at a pressure of 300 p. s. i. g. maintained by the back pressure control valve in the gas utilization line and normal flow progressed. During normal flow, the back pressure control valve in the emergency line was of course, open.

Partial failure of liquid recycle pumping facilities caused a decrease of the recycle lean liquid rate to below 70 gallons per minute and the motor valve was automatically opened thereby. Opening of the motor valve placed the entire emergency recycle line in communication with the absorber causing thereby a decrease in absorber pressure in view of the 170 p. s. i. g. pressure of the compressor intake. The back pressure valve in the gas utilization line closed immediately in response to the initial absorber pressure decrease. The back pressure control in the emergency line, set to maintain the absorber pressure at 285 p. s. i. g., caused the decrease in absorber pressure to cease at 285 p. s. i. g. and maintained the absorber pressure at that level during the remainder of the emergency flow to the compressor intake. Gas was discharged from the compressor to the absorber for retreatment and the emergency recycle was in operation.

The lean liquid recycle pumping difficulties were subsequently corrected and the recycle lean liquid rate of 80 gallons per minute was reestablished. However, subsequent to reestablishment thereof, the emergency recycle was continued until all insufficiently treated gas was purged from the absorber and effluent lines. Tests were made at intervals by the operator to ascertain the purity of the effluent treated gas. After about a 30 minute period following reestablishment of the lean liquid recycle rate the treated gas was found to be of purity to meet specifications required by the utilization. Thereafter, the effluent treated gas was diverted manually from emergency to normal flow by allowing the motor valve, which had been blocked in its open position subsequent to initiation of emergency flow, to close. The action of the rate of flow controller to close the motor valve was in effect immediately subsequent to restoration of a satisfactory lean liquid flow, which in this case was 70 gallons per minute or higher.

As will be evident to those skilled in the art, various modifications can be made or followed, in the light of the foregoing disclosure and discussion, without departing from the spirit or scope of the disclosure or from the scope of the claims.

I claim:

1. In a process for removing from a gaseous mixture acidic constituents contained therein, comprising passing said gaseous mixture to an absorption zone, therein contacting said gaseous mixture with a liquid absorption medium to remove said acidic constituents, passing effluent gaseous mixture substantially free of said acidic constituents from said absorption zone to a utilization requiring a gas substantially freed of said acidic constituents, passing enriched absorption medium to a desorbing zone and therein removing a gas containing acidic constituents, removing lean liquid absorption medium from said desorbing zone and recycling same to said absorption zone, the improvement comprising normally allowing unrestricted flow of effluent treated gas whenever the flow rate of recycled lean absorption medium is at least equal to a predetermined minimum value adequate to produce an effluent gas substantially free from acidic constituents, continuously measuring said flow rate of absorption medium, and diverting the flow of said effluent treated gas from its normal course in response to a decrease in said flow rate of absorption medium to below said minimum value.

2. In a process for removing from a gaseous mixture acidic constituents including hydrogen sulfide contained therein, comprising passing said gaseous mixture to an absorption zone, therein contacting said gaseous mixture with a liquid absorption medium to remove said acidic constituents, passing effluent gaseous mixture substantially free of said acidic constituents from said absorption zone to a utilization requiring a gas substantially freed of said acidic constituents, passing enriched absorption medium to a desorbing zone and therein removing a gas containing acidic constituents, removing lean liquid absorption medium from said desorbing zone and recycling same to said absorption zone, the improvement comprising normally allowing unrestricted flow of effluent treated gas whenever the flow rate of recycled lean absorption medium is at least equal to a predetermined minimum value adequate to produce an effluent gas substantially free from acidic constituents, continuously measuring said flow rate of absorption medium, whenever the flow rate of said absorption medium drops below said minimum value discontinuing the flow of fresh gaseous feed to said absorption zone and diverting the flow of said effluent treated gas from its normal course in response to a decrease in said flow rate below said predetermined minimum value and returning same to said absorption zone for retreatment therein, reestablishing the rate of flow of said absorption medium above said predetermined minimum and thereafter restoring flow of fresh gaseous feed to said absorption zone and discontinuing said return of gases to said absorption zone, and redirecting effluent gaseous mixture substantially free of acidic constituents from said absorption zone to said utilization.

3. In a process for removing from a gaseous mixture acidic constituents including hydrogen sulfide contained therein, comprising passing said gaseous mixture to an absorption zone, therein contacting said gaseous mixture with a liquid absorption medium to remove said acidic constituents, passing effluent gaseous mixture substantially free of said acidic constituents from said absorption zone to a utilization requiring a gas substantially freed of said acidic constituents, passing enriched absorption medium to a desorbing zone and therein removing a gas containing acidic constituents, removing lean liquid absorption medium from said desorbing zone and recycling same to said absorption zone, the improvement comprising normally allowing unrestricted flow of effluent treated gas whenever the flow rate of recycled lean absorption medium is at least equal to a predetermined minimum value adequate to produce an effluent gas free from acidic constituents, continuously detecting said flow rate of absorption medium, whenever the flow rate of said absorption medium drops below said minimum value diverting the flow of said effluent treated gas from its normal course in response to a decrease in said flow rate to below said predetermined minimum value, and returning same to said absorption zone for retreatment therein, subsequently causing said flow rate to increase to at least said minimum value, and thereafter passing gas freed of acidic constituents into normal flow.

4. An apparatus for treating a gas to remove acidic constituents therefrom by absorption in a liquid absorption medium, which comprises an absorber for effecting gas-liquid contact therein, a gas feed inlet conduit to said absorber, a liquid inlet conduit to said absorber for lean absorbent, a liquid outlet conduit connected with said absorber for withdrawal of enriched absorbent a gas utilization conduit connected with said absorber for passing treated gas to a desired utilization, an emergency conduit for passing effluent gas from said absorber, a flow-measuring means responsive to the rate of flow of liquid in said liquid inlet conduit, valve means disposed in said gas utilization and emergency conduits for diverting the flow of treated gas from said gas utilization conduit to said emergency conduit, and control means operatively connected with said valve means and said flow responsive means to move said valve means into flow diverting position in response to a decrease in rate of flow of said liquid to below a predetermined value.

5. An apparatus for preventing delivery as finished product of a gas insufficiently treated to remove acidic constituents therefrom by absorption in a liquid absorption medium, comprising an absorber for effecting gas-liquid contact therein, a gas feed inlet conduit to said absorber, a liquid inlet conduit to said absorber for lean absorbent, a liquid outlet conduit from said absorber for absorbent enriched with acidic constituents, a gas outlet from said absorber for removing treated gas therefrom, a gas utilization conduit connected with said gas outlet for delivering treated gas to a desired utilization, a compressor to accept gas feed at the intake for discharge at a higher pressure into said gas inlet conduit, an emergency recycle conduit for passing effluent gas from said gas outlet to the intake of said compressor when said effluent gas is insufficiently treated by virtue of the flow of liquid through said liquid inlet conduit decreasing to below a predetermined minimum, a first back pressure control valve located in said emergency recycle conduit and adapted to maintain a suitable predetermined minimum pressure in said absorber, a second back pressure control valve located in said gas utilization conduit adapted to maintain a pressure of said absorber at a suitable predetermined minimum above that maintained by said first back pressure control valve, said compressor intake adapted to operate at a pressure below that maintained by said first back pressure control valve, a motor valve located in said emergency recycle conduit downstream from said first back pressure control valve adapted to operate closed during flow of treated gas through said utilization conduit, a flow responsive means in said liquid inlet conduit for detecting flow of liquid therethrough, and a flow-type control means responsive to said responsive means, said flow-type control means being operatively connected with said motor valve to move said motor valve to an open position in response to a decrease in flow of said liquid below a predetermined minimum rate.

6. An apparatus for preventing delivery as finished product of a gas insufficiently treated to remove acidic constituents therefrom by absorption in a liquid absorption medium, comprising an absorber for effecting a gas-liquid contact therein, a gas feed inlet conduit to said absorber, a liquid inlet conduit to said absorber for lean absorbent, a liquid outlet conduit connected with said absorber for withdrawal of enriched absorbent a gas utilization conduit connected with said absorber for delivering treated gas to a desired utilization, a compressor to accept gas feed at the intake for discharge at a higher pressure in said gas inlet conduit, an emergency recycle conduit for passing effluent gas from said absorber to the intake of said compressor when said effluent gas is insufficiently treated by virtue of the flow of liquid through said liquid inlet conduit decreasing to below a predetermined minimum, a first back pressure control valve located in said emergency recycle conduit and adapted to maintain a suitable predetermined minimum pressure in said absorber, a second back pressure control valve located in said gas utilization conduit adapted to maintain a pressure of said absorber at a suitable predetermined minimum above that maintained by said first back pressure control valve, said compressor intake adapted to operate at a pressure below that maintained by said first back pressure control valve, a motor valve located in said emergency recycle conduit downstream from said first back pressure control valve and adapted to operate closed during flow of treated gas through said utilization conduit, a flow responsive means in said liquid conduit for detecting flow of liquid therethrough and a flow-type control means actuated by said flow responsive means, said flow-type control means being operatively connected with said motor valve to move said motor valve to an open position in response to a decrease in flow of said liquid below a predetermined minimum rate.

7. An apparatus for preventing delivery as finished product of a gas insufficiently treated to remove acidic constituents therefrom by absorption in a liquid absorption medium, comprising an absorber for effecting gas-liquid contact therein, a gas feed inlet conduit to said absorber, a liquid inlet conduit to said absorber for lean absorbent, a liquid outlet conduit from said absorber for absorbent enriched with acidic constituents, a gas utilization conduit connected with said absorber for delivering treated gas to a desired utilization, an emergency conduit for passing effluent gas from said absorber to a predetermined disposal when effluent gas is insufficiently treated by virtue of the flow of liquid through said liquid inlet conduit decreasing to below a predetermined minimum, said predetermined disposal being at a pressure lower than that of said utilization, a motor valve in said emergency conduit adapted to operate closed during flow of treated gas to said utilization, a check valve located in said gas utilization conduit to allow normal passage therethrough of treated gas from said gas outlet to said utilization and to prevent back flow therefrom, a flow responsive means in said liquid inlet conduit for detecting flow of liquid therethrough, a flow-type control means actuated by said responsive means, said flow-type control means being operatively connected to said motor valve to move said motor valve to an open position in response to a decrease in flow of liquid through said flow responsive means below a predetermined minimum rate, and said motor valve in an open position causing pressure of said absorber to decrease to that of said predetermined disposal thereby causing said check valve to close and to divert gas flow from said utilization to said disposal through said emergency conduit.

8. An apparatus for preventing delivery as finished product of a gas insufficiently treated to remove acidic constituents therefrom by absorption in a liquid absorption medium, comprising an absorber for effecting gas-liquid contact therein, a gas feed inlet conduit to said absorber, a liquid inlet conduit to said absorber for lean absorbent, a liquid outlet conduit from said absorber for absorbent enriched with acidic constituents, a gas outlet from said absorber for removing treated gas therefrom, a gas utilization conduit connected with said gas outlet for delivering treated gas to a desired utilization, a compressor to accept gas feed at the intake for discharge at a higher pressure into said gas inlet conduit, an emergency recycle conduit for passing effluent gas from said gas outlet to the intake of said compressor when said effluent gas is insufficiently treated by virtue of the flow of liquid through said liquid inlet conduit decreasing to below a predetermined minimum, a first control valve located in said utilization conduit, a second control valve located in said emergency recycle conduit, a flow responsive means in said liquid inlet conduit for detecting flow of liquid therethrough, a flow-type control means actuated by said responsive means, said flow-type control means being responsive to a decrease in flow of said liquid below a predetermined minimum rate, said first control valve adapted to maintain a suitable predetermined pressure in said absorber and also adapted to be moved by said flow-type control means to a closed position when said control means acts in response to a decrease in flow of said liquid through said liquid inlet below a predetermined minimum rate as measured by said flow responsive means, said second control valve adapted to maintain pressure of said absorber above that maintained by said first control valve thereby being closed during flow of treated gas to said utilization, and said first control valve in a closed position causing pressure of said absorber to increase to said higher predetermined minimum maintained by said second control valve and causing said second control valve to open thereby diverting said flow of treated gas from said utilization to said emergency recycle conduit.

9. An apparatus for preventing delivery as finished product of a gas insufficiently treated to remove acidic constituents therefrom by absorption in a liquid absorption medium, comprising an absorber for effecting gas-liquid contact therein, a gas feed inlet conduit to said absorber, a liquid inlet conduit to said absorber for said absorbent, a liquid outlet conduit connected with said absorber for withdrawal of enriched absorbent a gas utilization conduit connected with said absorber for delivering treated gas to a desired utilization, an emergency conduit for passing effluent gas from said absorber to a predetermined disposal when effluent gas is insufficiently treated by virtue of the flow of liquid through said liquid inlet conduit decreasing to below a predetermined minimum, said predetermined disposal being at a pressure lower than that of said utilization, a motor valve for diverting the flow of treated gas from said gas utilization conduit to said emergency conduit, a flow responsive means in said liquid inlet conduit for measuring flow of liquid therethrough, a control means actuated by said responsive means, said control means being operatively connected to said motor valve to move said motor valve to a flow diverting position in response to a decrease in flow of liquid through said flow responsive means below a predetermined minimum rate.

10. An apparatus for preventing delivery as finished product of a gas insufficiently treated to remove acidic constituents therefrom by absorption in a liquid absorption medium, comprising an absorber for effecting gas-liquid contact therein, a gas inlet conduit to said absorber, a liquid inlet conduit to said absorber for said absorbent, a liquid outlet conduit connected with said absorber for withdrawal of enriched absorbent a gas utilization conduit connected with said absorber for delivering treated gas to a desired utilization, an emergency conduit for passing effluent gas from said absorber to a predetermined disposal when effluent gas is insufficiently treated, said predetermined disposal being at a pressure lower than that of said utilization, a motor valve for diverting the flow of treated gas from said gas utilization conduit to said emergency conduit, means for measuring hydrogen sulfide content of effluent gas in said gas utilization conduit, said means for measuring hydrogen sulfide content being responsive to said hydrogen sulfide content, a control means actuated by said responsive means, said control means being operatively connected to said motor valve to move said motor valve to a flow diverting position in response to an increase of said hydrogen sulfide content to a value above a predetermined allowable maximum.

11. In a process for removing hydrogen sulfide from a gaseous mixture, comprising passing said gaseous admixture to an absorption zone, therein contacting said gaseous mixture with a liquid absorption medium to remove said hydrogen sulfide, passing effluent gaseous mixture substantially free of said hydrogen sulfide from said absorption zone to a utilization requiring a gas substantially freed of said hydrogen sulfide, passing enriched absorption medium to a desorbing zone and therein removing a gas containing hydrogen sulfide, removing lean liquid absorption medium from said desorbing zone and recycling same to said absorption zone, the improvement comprising normally allowing uninterrupted flow of effluent treated gas whenever said gas has been sufficiently treated to remove said hydrogen sulfide, continuously measuring the degree to which treatment of gas is effected in said absorption zone to remove said hydrogen sulfide and diverting the flow of effluent gas from said uninterrupted flow in response to a decrease in said degree of treatment to below a predetermined minimum as determined by said measuring.

12. In a process for removing from a gaseous mixture acidic components including hydrogen sulfide contained therein, comprising passing said gaseous admixture to an absorption zone, therein contacting said gaseous mixture with a liquid absorption medium to remove said acidic constituents, passing effluent gaseous mixture substantially free of said acidic constituents from said absorption zone to a normal utilization requiring a gas substantially freed of said acidic constituents, passing enriched absorption medium to a description zone and therein removing a gas containing acidic constituents, removing lean liquid absorption medium from said desorption zone and recycling same to said absorption zone, the improvement comprising recycling lean liquid absorption medium to the absorption zone through an orifice in the lean liquid recycle conduit at a rate at least equal to a predetermined minimum value adequate to produce effluent gas free from acidic constituents, said orifice being operatively connected with a rate of flow controller so as to actuate same when said lean liquid flow rate falls to below said predetermined minimum; passing effluent gas from said absorption zone to said normal utilization through a first effluent conduit, and a back pressure valve therein adapted to operate in an open position under pressure in the zone of said absorption; when said flow rate of lean liquid recycle falls to below said predetermined value, passing effluent gas from said absorption zone to a zone under a pressure below that of said absorption, through a second effluent line and a motor valve therein maintained in an open position by said rate of flow controller actuated by said orifice responding to said decrease in lean liquid flow; said back pressure valve being adapted to close in response to a resulting decrease in pressure in said absorption zone, whereby flow of insufficiently treated gas to said normal utilization is prevented and is isolated from said normal utilization.

References Cited in the file of this patent

UNITED STATES PATENTS

| Number | Name | Date |
|---|---|---|
| 1,758,891 | Parsons | May 13, 1930 |
| 2,105,686 | Cunningham | Jan. 18, 1938 |
| 2,134,507 | Cooke | Oct. 25, 1938 |
| 2,404,854 | Latchum, Jr., et al. | July 30, 1946 |